United States Patent [19]

Gallardo, Jr.

[11] 4,274,806
[45] Jun. 23, 1981

[54] STAIRCASE BLADE TIP

[75] Inventor: Vicente C. Gallardo, Jr., Hamilton, Ohio

[73] Assignee: General Electric Company, Cincinnati, Ohio

[21] Appl. No.: 49,780

[22] Filed: Jun. 18, 1979

[51] Int. Cl.³ .............................................. F01D 5/20
[52] U.S. Cl. ................. 415/172 A; 415/174; 416/228; 416/237
[58] Field of Search .......................... 415/172 A, 174; 416/228 R, 228 A, 237

[56] References Cited

U.S. PATENT DOCUMENTS

| | | | |
|---|---|---|---|
| 899,319 | 9/1908 | Parsons et al. | 415/172 A |
| 1,014,730 | 1/1912 | Way | 416/237 X |
| 1,206,058 | 11/1916 | Wakefield | 416/237 |
| 1,317,707 | 10/1919 | Johnson | 416/228 |
| 1,862,827 | 6/1932 | Parsons et al. | 416/228 X |
| 2,738,950 | 3/1956 | Price | 416/228 X |
| 3,403,893 | 10/1968 | Stoffer | 416/228 |
| 3,575,523 | 4/1971 | Gross | 415/172 A |
| 3,854,842 | 12/1974 | Caudill | 415/116 |
| 3,876,330 | 4/1975 | Pearson et al. | 415/172 A X |
| 3,885,886 | 5/1975 | Richter | 415/172 A X |

FOREIGN PATENT DOCUMENTS

| | | | |
|---|---|---|---|
| 1068395 | 6/1954 | France | 415/174 |
| 134451 | 10/1929 | Switzerland | 415/172 A |
| 736835 | 9/1955 | United Kingdom | 416/228 |
| 252066 | 7/1970 | U.S.S.R. | 416/228 |

*Primary Examiner*—Everette A. Powell, Jr.
*Attorney, Agent, or Firm*—Dana F. Bigelow; Derek P. Lawrence

[57] ABSTRACT

An airfoil blade tip is so configured that, when it is caused to rub against a surrounding casing, the resultant force acting on the blade tip is substantially in the tangential direction. In this way, axial forces on the airfoil are substantially reduced.

18 Claims, 4 Drawing Figures

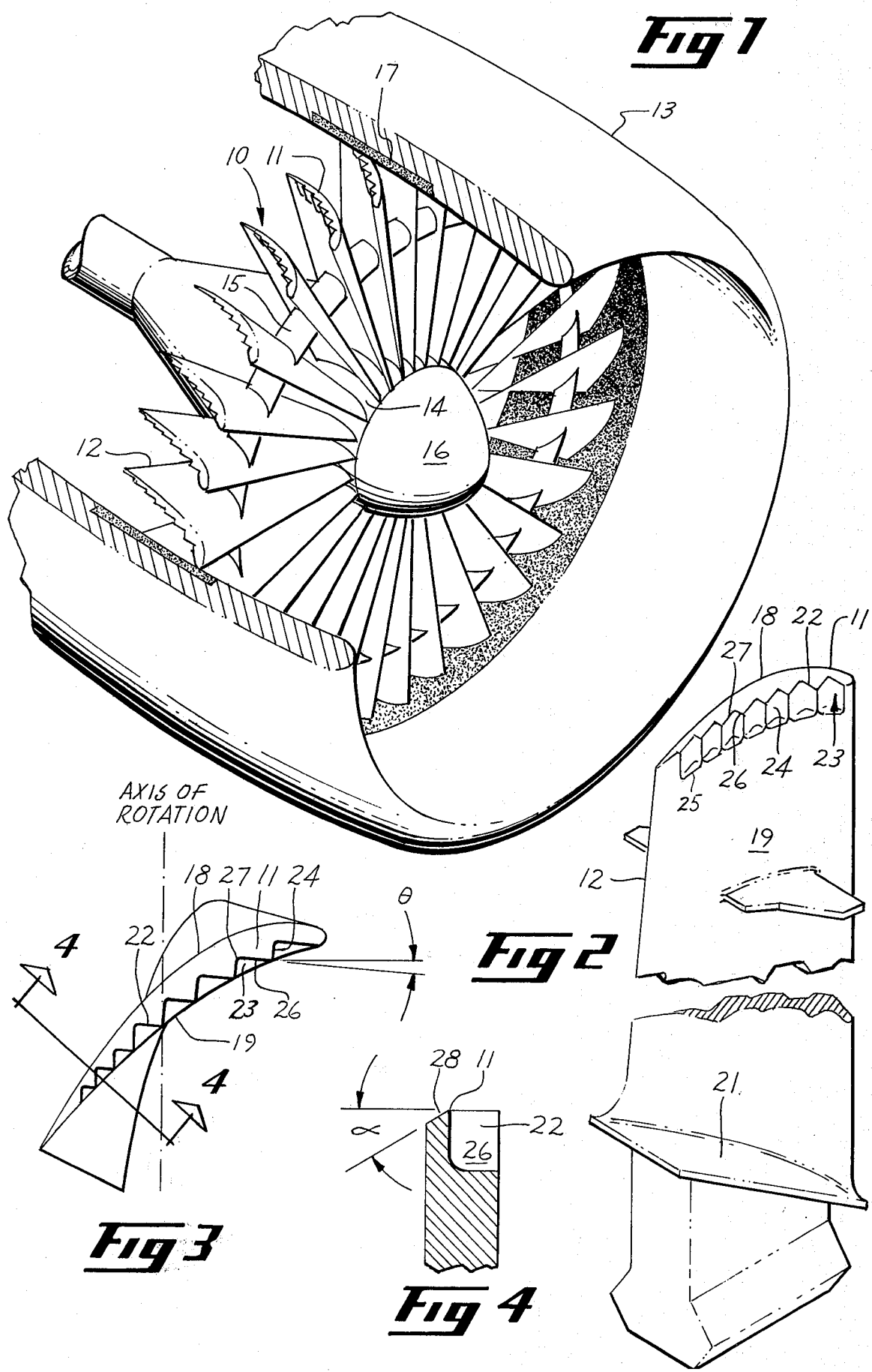

STAIRCASE BLADE TIP

The invention herein described was made in the course of or under a contract, or a subcontract thereunder, with the United States Department of the Air Force.

BACKGROUND OF THE INVENTION

The invention relates generally to turbomachinery and, more specifically, to the axial stabilization of airfoils therein.

Axial flow turbomachinery is generally constructed with one or more airfoil or blade rows being rotatably disposed in close radial relationship within an outer shroud or casing. In the case of a turbine, the motive gases flowing axially within the casing, perform work to rotate the airfoils, and in the case of a compressor or fan, the gases flowing within the casing are compressed by the airfoils or blades performing work on the gas. In either case, it is desired for the sake of efficiency to have the tips of the airfoils be as closely spaced to the casing as possible in order to reduce the amount of leakage of air therebetween. Of course, it is also necessary to prevent any substantial interference between the rotating airfoils and the stationary casing.

One approach, which has been commonly used, is that of placing an abradable material, such as honeycomb or the like, within the casing surrounding the airfoils and establishing a slight clearance between those components. With mechanical growth, the airfoils will then tend to slightly wear into or cut a groove into the abradable material to thereby establish a sealing relationship therebetween. However, even after a groove has been formed, because of the relative mechanical and thermal growth patterns between the rotating airfoils and the stationary casing, there will still be periodic rubs occurring, which in turn will transmit resistant forces to the airfoils or fan blades. Since the airfoils are necessarily twisted in order to compress the air when rotated, the blade tips are also disposed at an angle relative to the axis of rotation. Thus, where a rub occurs, there is transmitted to the blades a resultant force which has both tangential and axial components. To the extent that the rub forces are axial in direction, they tend to force the blades axially from their dovetail slots. If the rubs are severe enough, these axial forces may cause the blades to actually be forced from their dovetail positions to thereby cause severe damage to the turbomachine.

It is, therefore, an object of the present invention to reduce the axial rub forces acting on an airfoil.

Another object of the present invention is the provision in an airfoil/casing relationship for reducing the axial component of the reactive forces acting on the airfoil when it rubs against the surrounding casing.

Yet another object of the present invention is to maintain close clearances between an airfoil rotor and a surrounding casing without attendant relative axial forces.

Still another object of the present invention is the provision for an airfoil rotor and surrounding casing combination which are economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, the tip of an airfoil is so shaped that when it is rotated within and rubs against the surrounding casing, the resultant forces acting on the airfoil are substantially in the tangential direction. The axial components of the resultant rub force are therefore substantially reduced or eliminated to thereby alleviate the problem of the airfoil working loose from its retaining disc or rotor.

By another aspect of the invention, the airfoil tip has a serrated profile such that when the teeth are rubbed against the surrounding casing, the resultant axial forces acting on the two sides of each tooth are substantially in the tangential direction.

By still another object of the present invention, the tip of an airfoil has formed thereon a plurality of teeth with their apexes on the pressure side of the airfoil. One of the sides of each of the teeth is aligned substantially with the airfoil axis of rotation and the other side thereof is aligned substantially in the airfoil tangential direction. With such an arrangement, any axial forces on the blade which may result from its rubbing the casing are substantially eliminated.

By yet another aspect of the invention, one side of each of the teeth is so aligned as to form a small angle with the airfoil tangential vector such that the side makes no contact with the casing when the other side thereof rubs against the casing.

In the drawings, as hereinafter described, the preferred embodiment is depicted; however, various other modifications and alternate constructions can be made thereto without departing from the true spirit and scope of the invention.

BRIEF DESCRIPTION OF THE DRAWINGS

FIG. 1 is a perspective view of a fan and casing arrangement having the present invention embodied therein.

FIG. 2 is a perspective view of the tip portion of one of the airfoils thereof.

FIG. 3 is a schematic illustration of the airfoil tip in accordance with the preferred embodiment of the invention.

FIG. 4 is an end view thereof as seen along lines 4—4 of FIG. 3.

DESCRIPTION OF THE PREFERRED EMBODIMENT

Referring now to FIG. 1, the invention is shown generally at 10 as applied to the tips 11 of airfoils or fan blades 12 which are disposed in a row in circumferential spaced relationship within a surrounding shroud or casing 13. The blades 12 are individually secured in the hub of a rotor 14 with means for retaining them, both radially and axially, within the rotor 14. Fastened to the forward end of the rotor 14 is a spinner cone 16 which provides a smooth aerodynamic flow of the air radially outward to the blades 12. Extending tangentially from either side of each of the fan blades 12 is a mid span shroud 15 which engages that of the adjacent blade so as to inhibit any local vibratory stresses.

Concentrically surrounding the row of fan blades 12, the casing 13 forms the outward boundary of the airflow through the blades 12. The radial spacing between the inner surface of the casing 13 and the tips 11 of the blades 12 is preferably a uniform minimum throughout the circumference such that little or no air leakage occurs between those elements. In order to facilitate such a close fit relationship, and in order to accommodate occasional rubs therebetween, a relatively soft abradable material, such as a honeycomb structure or the like, is placed on the inner surface of the casing 13 adjacent the blade tips 11, as indicated by the numeral 17. The intent is to allow occasional rubs of the blade tips 11 against the abradable material 17 and to thereby cut circumferential grooves into the abradable material 17 to provide a sealing relationship that prevents the axial flow of air between those elements.

Directing attention now to the fan blade 12, as shown in FIG. 2, the body of the blade is convex and concave on the suction and pressure sides 18 and 19, respectively, thereof. On the radially inner end of the blade 12 is a T-shaped platform 21 for placement within a dovetail slot of the disc. On the radially outer end of the blade 12, the tip 11 has a plurality of serrations or teeth 22 formed therein by the forming of recesses 23 on the blade pressure side 19. Each of the teeth 22 have longitudinal and front edges or walls 24 and 26, which extend radially with respect to the blade axis of rotation or longitudinally with respect to the blade itself. Thus, each of the recesses 23 is defined by longitudinal and front walls of adjacent teeth and a bottom wall 25. It should be noted that the transition corner 27 between adjacent teeth 22 is preferably rounded in shape so as to reduce the concentration of stresses in that area. The circumferential and radial depths of the recesses 23 will be determined by the strength and performance requirements of the particular installation. The present invention is concerned with the desired alignment of the longitudinal wall 24 and front wall 26 of the teeth 22 in respect to the blade axis of rotation, since it is these teeth that are exposed to a rubbing against the inner surface of the surrounding casing.

Referring to FIGS. 3 and 4, a blade tip 11 having a plurality of such teeth 22 formed thereon is shown to be rotating in the direction indicated. It will be understood that if such a blade tip does rub against the surrounding casing, it will be the teeth 22 themselves that make the contact since their apexes extend in the direction of rotation as shown. During a rub, forces will thus be transmitted through the teeth longitudinal and front walls 24 and 26, to the blade 12. It is the intent of the present invention to eliminate or minimize any axial component of force being exerted on the blades.

In the preferred embodiment, the longitudinal wall 24 of each of the teeth 22 is disposed in substantial alignment with the axis of rotation or, said in another way, normal to the tangential direction of rotation. As this surface may then rub against the outer casing, all reaction forces will be in the tangential direction or normal to the axis of rotation. Thus, there will be no axial forces transmitted to the blade 12 by the rubbing of this surface against the casing. The front wall 26 of each of the teeth 22 may be aligned normal to that of the longitudinal wall 24 or substantially in alignment with the tangential direction of rotation in which case, it should not rub the casing and therefore should not be subject to any reaction forces. However, it is preferable that this surface be slightly offset by an angle $\theta$, as shown, such that it will in effect be hidden behind the tooth longitudinal wall 24 so as to assure that it will not rub against the casing wall. In this way, the only surface which will rub will be that of the teeth front walls 24, and their alignment are such that the only forces transmitted are forces in the tangential direction. In order to reduce the possibility of the nontooth portion 28 of the tip 11 rubbing on the casing, it may be desirable to bevel that surface, as shown in FIG. 4. The angle $\alpha$ of bevel may, of course, be selected to suit a particular installation.

In respect to the angle $\theta$ of FIG. 3, it has been found that it should generally be in the range of 1.5–10 degrees. More specifically, this angle $\theta$ can appropriately be selected as a function of an angle $\phi$ wherein tangent $\phi$ is substantially equal to the quotient $$\frac{\text{the axial vibrational velocity of the blade tip}}{\text{the tangential peripheral velocity of the blade tip.}}$$

Preferably, the angle $\theta$ should exceed the angle $\phi$ by at least one degree.

Although the invention has been described in terms of particular structure, it should be understood that other forms may be used while remaining within the scope of the present invention. For example, although the invention has been described in connection with a fan blade, it may just as well be used in other turbomachinery such as compressor or turbine blades. Also, though it will be recognized that the particular blade tip structure is for a cantilevered or part-span shrouded blade having a free tip, the principle of the invention may be applied to the tip-shrouds or circumferential seals of tip shrouded blades or rotating seals.

Therefore, having described a preferred embodiment of the invention, what is desired to be secured by Letters Patent of the United States is as follows:

1. An airfoil for rotation within a casing wall, including pressure and suction sides and a blade tip having a transverse planar surface defining an edge on the pressure side of said airfoil for rubbing against and effecting a seal with said casing wall, said edge comprising a plurality of discrete edge segments at least one of which extends substantially parallel to the airfoil axis of rotation, whereby upon rotation of said airfoil and rubbing of said edge thereof against said casing wall, a resultant force is exerted on said airfoil in a direction substantially normal to said airfoil axis of rotation.

2. An airfoil as set forth in claim 1, wherein said edge is serrated, and said edge segment which extends substantially parallel to the airfoil axis of rotation is one of a plurality of such edge segments in the serrated edge.

3. An airfoil as set forth in claim 1, wherein said edge is serrated and defined by a plurality of triangular teeth each having a front and a longitudinal wall extending radially from said transverse planar surface of said blade tip and intersecting at an apex on said pressure side of said airfoil, and wherein the intersection of said longitudinal wall and said transverse planar surface defines one of said discrete edge segments extending substantially parallel to the airfoil axis of rotation.

4. An airfoil as set forth in claim 3 wherein said longitudinal wall of each of said teeth is aligned substantially parallel with the airfoil axis of rotation.

5. An airfoil as set forth in claim 3 wherein said longitudinal wall of each of said teeth is aligned substantially normal to the front wall thereof.

6. An airfoil as set forth in claim 3 wherein said front wall of each of said teeth is aligned substantially parallel with the airfoil direction of rotation.

7. An airfoil as set forth in claim 3 wherein said front wall of each of said teeth is aligned to form a small angle with the airfoil direction of rotation.

8. An airfoil as set forth in claim 3 wherein said front and longitudinal walls of each of said teeth form an angle of less than 90 degrees.

9. An airfoil as set forth in claim 7 wherein said small angle is in the range of 1.5–10 degrees.

10. An airfoil as set forth in claim 7 wherein said small angle is chosen as a function of an angle $\phi$, wherein tangent $\phi$ is substantially equal to the quotient $$\frac{\text{the axial vibrational velocity of the blade tip}}{\text{the tangential peripheral velocity of the blade tip.}}$$

11. An airfoil as set forth in claim 10 wherein said small angle exceeds by at least 1 degree an angle $\phi$ whose tangent is equal to the quotient $$\frac{\text{the axial vibrational velocity of the blade tip}}{\text{the tangential peripheral velocity of the blade tip.}}$$

12. An airfoil as set forth in claim 3 wherein the transition corner between adjacent teeth is curvilinear in form so as to minimize stress concentrations thereat.

13. An improved aerodynamic blade of the type having a tip, a radially outer planar tip surface extending transversely from the leading to the trailing edge of said blade, and pressure and suction sides terminating at said planar tip surface, said blade being rotatable about a blade axis of rotation for rubbing and sealing engagement with said casing wall wherein the improvement comprises:
a plurality of teeth defined by indentations extending radially inward from said blade tip surface and laterally inward from said blade pressure side, said teeth being triangular and each having a front and a longitudinal wall extending radially from said tip surface in said blade tip and intersecting at an apex extending laterally toward the blade pressure side, and said longitudinal wall being aligned substantially parallel with said blade axis of rotation, whereby upon rotation of said blade and rubbing of said blade tip against the surface of the casing wall, a resultant force is exerted on said blade in a direction substantially normal to said blade axis of rotation.

14. An improved aerodynamic blade as set forth in claim 13 wherein said front wall of each of said teeth is aligned substantially normal to said longitudinal wall.

15. An improved aerodynamic blade as set forth in claim 13 wherein said front wall of each of said teeth is aligned substantially parallel with the blade direction of rotation.

16. An improved aerodynamic blade as set forth in claim 13 wherein said front wall of each of said teeth is aligned to form a small angle with the blade direction of rotation.

17. An improved aerodynamic blade as set forth in claim 13 wherein said front and longitudinal walls of each of said teeth form an angle of less than 90 degrees.

18. An improved aerodynamic blade as set forth in claim 16 wherein said small angle is in the range of 1.5–10 degrees.

* * * * *